United States Patent
Georgiev et al.

(10) Patent No.: US 7,471,824 B1
(45) Date of Patent: Dec. 30, 2008

(54) METHOD AND APPARATUS FOR DEPOSTERIZING A POSTERIZED DIGITAL IMAGE

(75) Inventors: Todor G. Georgiev, Sunnyvale, CA (US); Jen-Chan Chien, Cupertino, CA (US)

(73) Assignee: Adobe Systems Incorporated, San Jose, CA (US)

(*) Notice: Subject to any disclaimer, the term of this patent is extended or adjusted under 35 U.S.C. 154(b) by 636 days.

(21) Appl. No.: 11/123,378

(22) Filed: May 5, 2005

(51) Int. Cl.
*G06K 9/00* (2006.01)
*G09G 5/02* (2006.01)

(52) U.S. Cl. .................................. 382/167; 345/597

(58) Field of Classification Search ................ 382/162, 382/163, 167, 168, 205, 254, 260, 279; 345/589, 345/597, 600, 611, 619, 620
See application file for complete search history.

(56) References Cited

U.S. PATENT DOCUMENTS 6,217,165 B1 * 4/2001 Silverbrook .................. 347/86
6,317,192 B1 * 11/2001 Silverbrook et al. .......... 355/18
6,587,592 B2 7/2003 Georgiev et al. ............ 382/254

* cited by examiner

*Primary Examiner*—Kanji Patel
(74) *Attorney, Agent, or Firm*—Robert C. Kowert; Meyertons, Hood, Kivlin, Kowert & Goetzel, P.C.

(57) ABSTRACT

One embodiment of the present invention provides a system that deposterizes a posterized image. During operation, the system receives a posterized image, wherein pixels in the posterized image have color values that belong to a set of posterized color values, which is a subset of a set of possible color values for the deposterized image. Next, the system generates a deposterized image from the posterized image, wherein color values in the deposterized image are not restricted to the set of posterized color values and instead can be selected from the entire set of possible color values to reduce artifacts caused jumps in color values that arise from posterization. While generating the deposterized image, the system selects color values for pixels in the deposterized image so that the deposterized image can be reposterized to restore the original posterized image.

20 Claims, 6 Drawing Sheets

METHOD AND APPARATUS FOR DEPOSTERIZING A POSTERIZED DIGITAL IMAGE

BACKGROUND

1. Field of the Invention

The present invention relates to computer-based tools for manipulating digital images. More specifically, the present invention relates to a method and an apparatus for deposterizing a posterized digital image.

2. Related Art

Unlike conventional film-based images, digital images can be loaded onto a computer system. This allows the digital images to be edited and otherwise manipulated using computer-based image-editing tools.

These image-editing tools are often used to manipulate posterized images, which have a reduced number of discrete levels in each color channel. Hence, these posterized images have fewer distinct colors (red, green, and blue) as compared with non-posterized images, which can have color values that span the full range of possible color values (from 0 to 255). For example, a posterized image can include: a black-and-white 1-bit image; a 16-bit image that originates from a 12- to 14-bit device; or an 8-bit image which has been converted into a 16-bit image.

Posterized images can be problematic. One problem is that they lack pixel depth and certain areas are void of detail. Existing image-processing techniques can be used to apply adjustments to posterized images to bring out the expected detail, but unfortunately these existing techniques produce only limited results. Furthermore, applying other image processing techniques to posterized images often produces artifacts due to jumps in pixel values. For example, "image-sharpening" tools (such as the "Unsharp Mask" in Adobe Photoshop™) are adversely influenced by the posterization "steps" in the image. These image-sharpening tools can produce unnatural results because they outline the "steps" instead of sharpening the image.

To avoid the above-described problems, people try to "blur" posterized images. For example, a Gaussian blur of radius 1-2 pixels can improve the histogram of color values for the image somewhat, so that now the image is essentially not posterized, even if some traces of posterization remain. However, we pay a price in blurring an image because the blurring process causes image details to be lost. Complete removal of posterization currently requires more than a 2-pixel Gaussian blur, which is excessive and bad for the image. Consequently, at present, people have to live with the posterization-versus-blur tradeoff.

Furthermore, because information is lost during the blurring process, it is not possible to restore the original posterized image from the "blurred" image.

Hence, what is needed is a method and an apparatus for deposterizing an image without the above-described problems.

SUMMARY

One embodiment of the present invention provides a system that deposterizes a posterized image. During operation, the system receives a posterized image, wherein pixels in the posterized image have color values that belong to a set of posterized color values, which is a subset of a set of possible color values for the deposterized image. Next, the system generates a deposterized image from the posterized image, wherein color values in the deposterized image are not restricted to the set of posterized color values and instead can be selected from the entire set of possible color values to reduce artifacts caused jumps in color values that arise from posterization. While generating the deposterized image, the system selects color values for pixels in the deposterized image so that the deposterized image can be reposterized to restore the original posterized image.

In a variation on this embodiment, while generating the deposterized image, the system selects color values in the deposterized image so that the resulting deposterized image can be reposterized by rounding each color value in the deposterized image to a nearest posterized color value.

In a further variation, while generating the deposterized image, the system first produces a histogram for color values in the posterized image, wherein the histogram has peaks at color values which belong to the set of posterized color values. Next, the system calculates constraints for each posterized color value in the form of a minimum bound and a maximum bound. The minimum bound and the maximum bound for a given posterized color value are selected so that any corresponding deposterized color value between the minimum bound and the maximum bound will be rounded to the given posterized color value during the reposterization process. Finally, the system calculates a color values for pixels in the deposterized image by solving a partial differential equation (PDE) for each pixel in the deposterized image subject to the calculated constraints on the minimum bound and the maximum bound associated with the corresponding posterized color value.

In a further variation, while solving the PDE for each pixel in the deposterized image subject to the calculated constraints, the system iteratively applies a kernel to each pixel in the deposterized image to generate a new pixel value. If the new pixel value lies outside of a range defined by the calculated constraints, the system clips the new pixel value to fall within the range.

In a variation on this embodiment, the PDE is a Laplace equation, wherein a solution to the Laplace equation is continuous and has no lines of discontinuity in the solution's derivative.

In a variation on this embodiment, the PDE is a biharmonic PDE, wherein a solution to the biharmonic PDE is continuous, and has no lines of discontinuity in the solution's derivative, while at the same time minimizing curvature.

In a variation on this embodiment, generating the deposterized image involves applying the deposterization operations separately to each color channel in the posterized image.

In a variation on this embodiment, the posterized image is generated through either: (1) a simple posterization process which generates posterized color values which are evenly spaced across the set of possible color values for the deposterized image; or (2) a complex posterization process which generates posterized color values which are not evenly spaced across the set of possible color values for the deposterized image.

DETAILED DESCRIPTION

Figure 1:
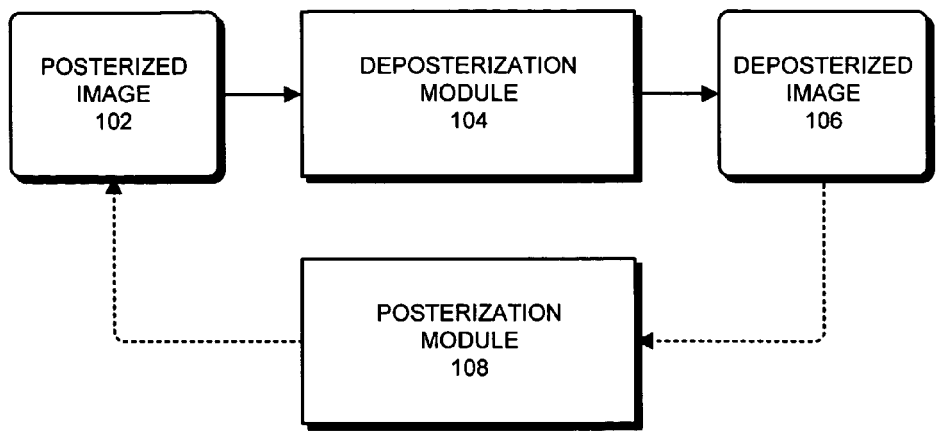
FIG. 1 illustrates a deposterization module in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Deposterization

In one embodiment of the present invention, while generating the deposterized image, the system uses the full range of available pixel values while calculating new pixel values to replace old pixel values. For example, a 1-bit black-and-white image which is converted into an 8-bit image will have only 2 pixel values: 0 and 255. After deposterization, the resulting deposterized image can potentially have all pixel values: 0, 1, 2, ..., 255. In another example, a 16-bit image created from an eight-bit image will have only 256 pixel values, and is therefore missing a big range of pixel values at each "step." After deposterization, the image can contain all 64K possible 16-bit pixel values.

The new pixel values in the deposterized image are smooth because they are generated by solving an appropriate Partial Differential Equation (PDE). Hence, "steps" are avoided. As is described in more detail below, the technique can minimize curvature while still remaining within the posterization pixel range. At the same time, pixels are not "too smooth," which would introduce unwanted blur.

Furthermore, the deposterization process described in this specification has the "round trip" property. If an image is deposterized and posterized again, the original image is restored. In other words, information has not been lost. In this way, the present invention differs from any possible blurring technique for deposterization, because blurring techniques cause information to be lost. The present invention does not blur and hence does not lose detail.

Note that a posterized image is like a staircase, with its height being the grayscale value of pixels. During the deposterization process, we want the steps to be as smooth as possible. Think of stretching cloth (carpet) on top of a staircase. This produces a smooth surface, but at the edge of each step the cloth might be "folded" or "broken" in the sense that slope may have a discontinuity if the staircase becomes flat for a few steps. Smoothness can be achieved by solving the Laplace PDE with boundary conditions supplied by the steps.

The above-described problem leads us to the next improvement. Imagine a big metal plate placed on top of the staircase. The plate is not only continuously interpolating from step to step, but it is also not broken (not folded) at places where our staircase changes. The metal plate simply does not want to fold sharply. It tries to minimize overall curvature, while following approximately the average outline of the stairs. The so-called biharmonic PDE has this property of minimizing curvature.

Furthermore, to avoid our metal plate going sometimes too far from the stairs, we use constraints. For example, one constraint can be that the metal plate has to remain always within a half step above or below the current step. This type of constraint can be built in into an engine for solving the constrained PDE in such a way that the technique is guaranteed to converge.

The present invention is described in more detail in the following discussion.

Deposterization Module

FIG. 1 illustrates a deposterization module 104 in accordance with an embodiment of the present invention. Deposterization module 104 converts a posterized image 102 into a corresponding deposterized image 106. In doing so, deposterization module 104 ensures that the deposterized image 106 can be reposterized by feeding it through a corresponding posterization module 108 to restore posterized image 102.

Data Structures

Figure 2:
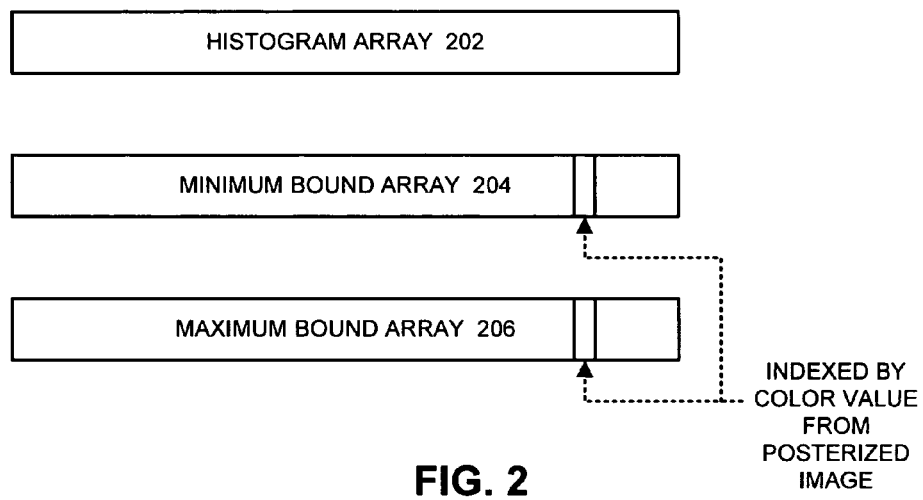
FIG. 2 illustrates some of the data structures involved in the deposterization process in accordance with an embodiment of the present invention.

FIG. 2 illustrates some of the data structures involved in the deposterization process in accordance with an embodiment of the present invention. These data structure include a histogram array 202, a minimum bound array 204, and a maximum bound array 206. Each of these arrays can be indexed by a color value, so if there are $2^{15}$ possible color values, each array will have $2^{15}$ entries.

For a given color value, histogram array 202 has an entry containing a number, which indicates the number of pixels in the image which have the color value. Similarly, for a given "posterized" color value, minimum bound array 204 and maximum bound array 206 store minimum and maximum bounds for the posterized color value. These minimum and maximum color values act as constraints to ensure that a corresponding deposterized color value does not stray to far from its initial posterized color value. This deposterization process is described in the following flow charts.

Deposterization Process

Figure 3:
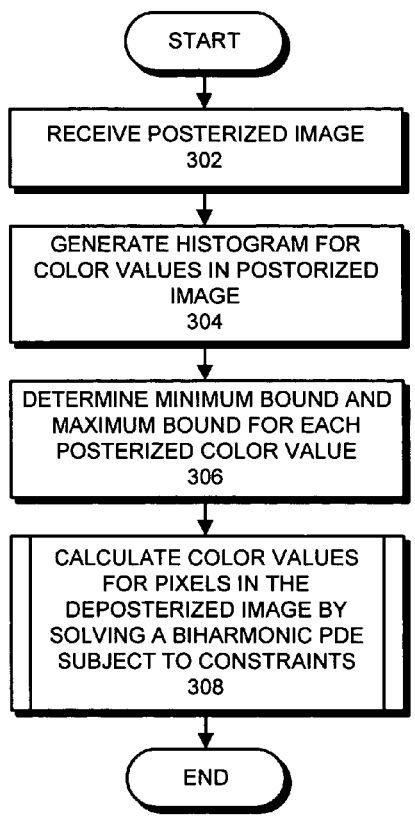
FIG. 3 presents a flow chart illustrating the deposterization process in accordance with an embodiment of the present invention.

FIG. 3 presents a flow chart illustrating the deposterization process in accordance with an embodiment of the present invention. This process starts when the system receives the posterized image (step 302).

Next, the system generates a histogram for color values in the posterized image (step 304). In one embodiment of the present invention, this involves generating an array, such as histogram array 202, wherein each entry is associated with a color value and contains a value indicating the number of pixels in the posterized image which have the associated color value.

Next, the system determines a minimum bound and a maximum bound for each posterized color value (step 306). In one embodiment of the present invention, this is involves selecting minimum and maximum bounds so that any corresponding deposterized color value between the minimum bound and the maximum bound will be rounded to an associated posterized color value during the reposterization process.

For example, if there are posterized color values 1.0, 2.0 and 3.0, the minimum and maximum bounds for 2.0 can be 1.5 and 2.5, respectively. In this way, any corresponding deposterized color value between 1.5 and 2.5 will be rounded to 2.0.

Next, the system calculates color values for pixels in the deposterized image by solving a biharmonic PDE, subject to the minimum bound and maximum bound constraints calculated above (step 308).

Figure 4:
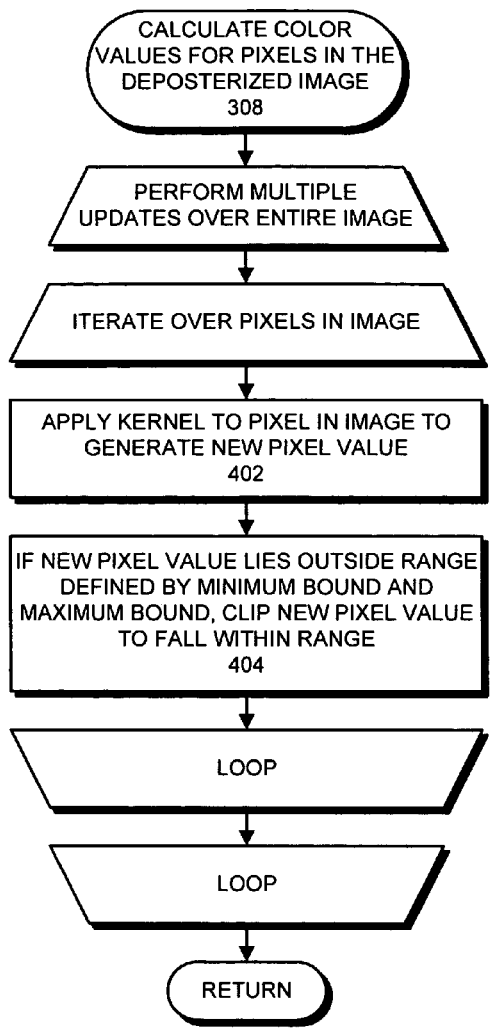
FIG. 4 presents a flow chart illustrating how updated color values are computed during the deposterization process in accordance with an embodiment of the present invention.

The process of solving this biharmonic PDE is described in more detail in the flow chart that appears in FIG. 4. As illustrated in FIG. 4, this process starts by receiving the posterized image and copying it into an initial deposterized image. The deposterized image is then refined by iteratively updating the entire image (see outer loop of flow chart). During each of these updates, the system iterates over all pixels in the image (see inner loop in flow chart).

For a given pixel, the system applies a kernel for solving a biharmonic PDE (or a Laplace equation) to the given pixel and its neighboring pixels to generate a new pixel value (step 402). This process is described in more detail below in he the discussion related to FIG. 5.) If the new pixel value lies outside of the range defined buy the minimum and maximum bounds for the associated pixel in the posterized image, the system clips the new color value to fall within the range (step 404). This ensures that the color value for a given pixel does not stray far from its initial posterized color value, and will be rounded to the initial posterized color value if the image is posterized again.

For example, suppose an initial posterized color value=2, and its associated minimum and maximum bounds indicate that it needs to be clipped between 1.5 and 2.5. If the current iteration calculates new value=2.6 for the pixel, we replace it with 2.499999, and continue iterating.

If we solve a biharmonic PDE, these iterations will converge to a constrained solution of the bi-harmonic PDE. This constrained solution will be: (1) a biharmonic function wherever it does not touch the constraints, (2) substantially equal to a constraint at the area where it reaches it, and (3) smooth at the boundary of that area (i.e. the value and first derivative at the boundary are continuous).

Also, note that the biharmonic equation has the property that it minimizes curvature (Laplacian of the image), and this is why we sometimes prefer it to the Laplace equation. The solution is continuous and has no 'sharp folds', i.e. no lines of discontinuity in the derivative, while at the same time it remains always within the constraints, and minimizes curvature.

Kernel

Figure 5:
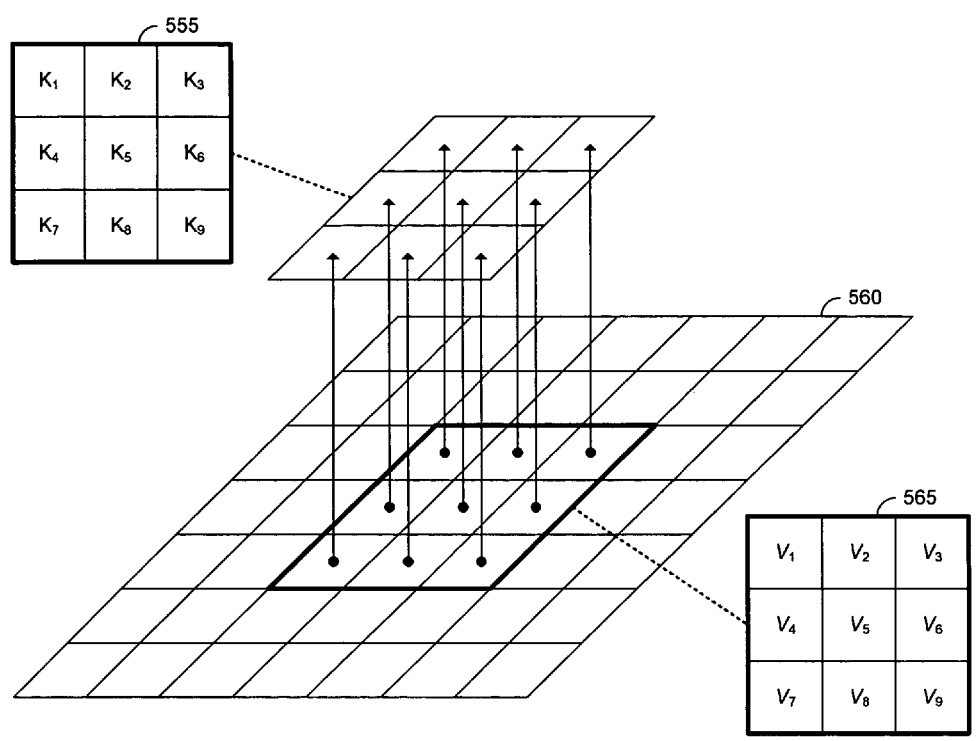
FIG. 5 illustrates a kernel which can be used during an iterative process for solving a PDE in accordance with an embodiment of the present invention.

FIG. 5 illustrates a kernel which can be used during an iterative process for solving a PDE in accordance with an embodiment of the present invention. Referring to FIG. 5, kernel 555 represents a mathematical operation that changes the current pixel data value based on the current pixels and surrounding pixels. The number of surrounding pixels included in the kernel depends in the size of the kernel and its constants. For example, the kernel 555 has a size of three by three and has constants $K_1, K_2, K_3, K_4, K_5, K_6, K_7, K_8$ and $K_9$.

When kernel 555 is applied at the current pixel, a kernel shadow 565 is defined on the image portion 560, and the pixel values $V_1, V_2, V_3, V_4, V_5, V_6, V_7, V_8$ and $V_9$ from shadow 565 are used in the calculation of the new pixel data value for the current pixel, according to:

$$V_5 = V_5 + \frac{\sum_{i=1}^{9} K_i V_i}{KernelDivisor}$$

Note that one or more of the kernel constants $K_1, K_2, K_3, K_4, K_5, K_6, K_7, K_8$ and $K_9$ may be zero. Thus, particular surrounding pixels that affect the change in the current pixel depend on both the size of the kernel and the constants in the kernel.

Many different kernels may be used to generate new pixel data values that result in continuous values and continuous changes in values at the boundary of the selected region. Moreover, multiple kernels may be used to generate new pixel data values that result in multiple orders of continuity at the boundary of the selected region.

For example, the kernels may be selected such that their iterative application results in a solution to a Laplace-type equation of orders higher than the traditional Laplace equation. Thus, each channel may be a solution of the Laplace equation with the given boundary conditions:

$$\Delta f(x,y)=0,$$

where $\Delta$ is the Laplace operator, $$\Delta = \frac{\partial^2}{\partial x^2} + \frac{\partial^2}{\partial y^2}.$$

The solution is continuous at the boundary, but not smooth. The fourth-order equation may be:

$$\Delta^2 f(x,y)=0,$$

where $\Delta^2=\Delta \cdot \Delta$ (i.e., Laplacean squared). The solution to this fourth-order equation depends not only on the pixels at the boundary, but also on the rate of change of pixels (partial derivatives) at the boundary. So both inside and outside the slope is the same. This achieves a higher level of smoothness. (For a more complete discussion of how to apply kernels, please refer to U.S. Pat. No. 6,587,592, entitled "Generating Replacement Values for an Image Region," issued Jul. 1, 2003, by inventors Georgiev et al, which is hereby incorporated by reference.)

Histograms

Figure 6A:
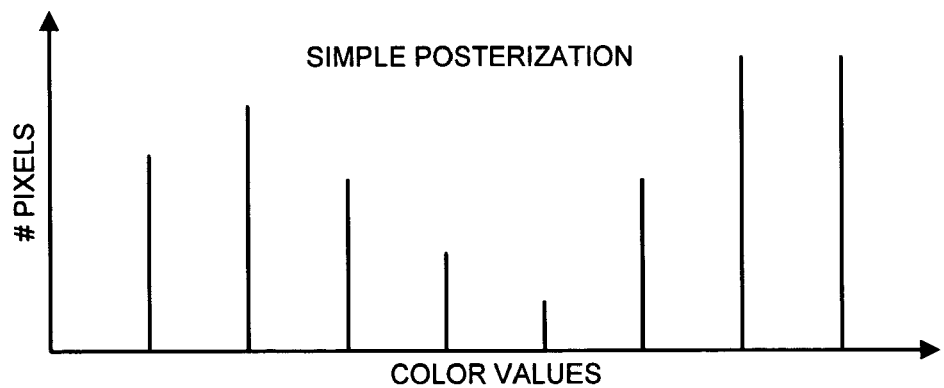
FIG. 6A presents a histogram for a posterized image generated through a simple posterization process in accordance with an embodiment of the present invention.

FIG. 6A presents a histogram for a posterized image generated through a simple posterization process in accordance with an embodiment of the present invention. This simple posterization process uses posterized color values which are evenly spaced across the set of possible color values. Consequently, the peaks which appear in the histogram of FIG. 5A are evenly spaced across the histogram.

Figure 6B:
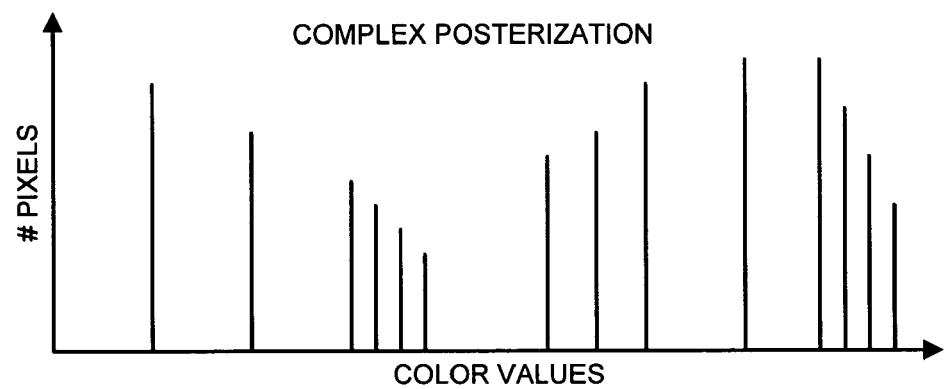
FIG. 6B presents a histogram for a posterized image generated through a complex posterization process accordance with an embodiment of the present invention.

FIG. 6B presents a histogram for a posterized image generated through a complex posterization process accordance with an embodiment of the present invention. This complex posterization process uses posterized color values which are not evenly spaced across the set of possible color values. Consequently, the peaks which appear in the histogram of FIG. 5A are not evenly spaced across the histogram. Note that the corresponding minimum and maximum bounds for each posterized color value have to be selected to account for this uneven spacing.

Example Images

Figure 7A:
FIG. 7A presents en exemplary posterized image accordance with an embodiment of the present invention.

FIG. 7A presents an exemplary posterized image accordance with an embodiment of the present invention. Note that because of the limited number of posterized color values, the steps between color values are not smooth and are consequently quite visible in this image.

Figure 7B:
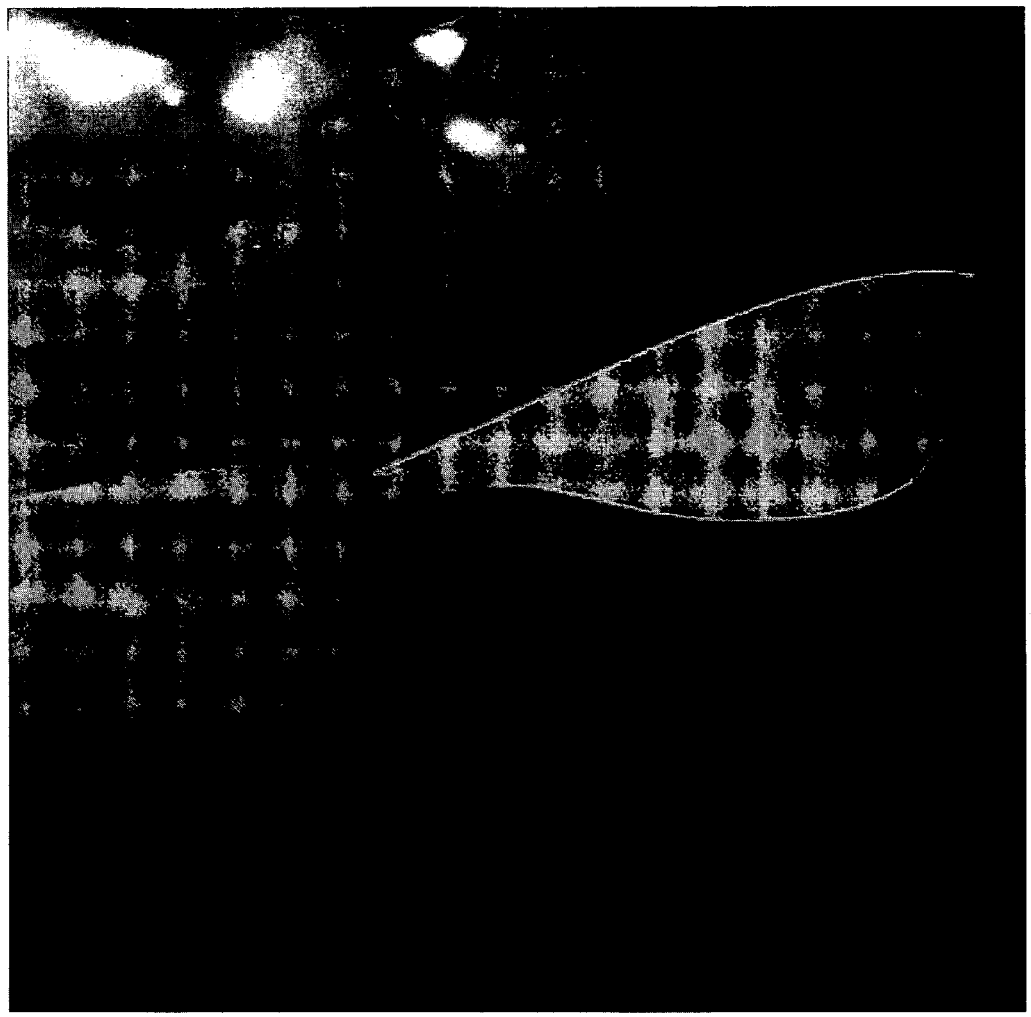
FIG. 7B presents en exemplary deposterized image accordance with an embodiment of the present invention.

FIG. 7B presents en exemplary deposterized image accordance with an embodiment of the present invention. Note that the steps between color values, which are visible in FIG. 7A, have been largely smoothed out.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for deposterizing a posterized image, comprising:
receiving the posterized image, wherein pixels in the posterized image have color values that belong to a set of posterized color values, which is a subset of a set of possible color values for the deposterized image; and
generating a deposterized image from the posterized image, wherein color values in the deposterized image can be selected from the entire set of possible color values to reduce artifacts caused jumps in color values that arise from posterization;
wherein while generating the deposterized image, color values for pixels in the deposterized image are selected so that the deposterized image can be reposterized to restore the posterized image.

2. The method of claim 1, wherein while generating the deposterized image, color values in the deposterized image are selected so that the resulting deposterized image can be reposterized by rounding each color value in the deposterized image to a nearest posterized color value.

3. The method of claim 2, wherein generating the deposterized image involves:
generating a histogram for color values in the posterized image, wherein the histogram has peaks at color values which belong to the set of posterized color values;
calculating constraints for each posterized color value in the form of a minimum bound and a maximum bound, wherein the minimum bound and the maximum bound for a given posterized color value are selected so that any corresponding deposterized color value between the minimum bound and the maximum bound will be rounded to the given posterized color value during the reposterization process; and
calculating color values for pixels in the deposterized image by solving a partial differential equation (PDE) for each pixel in the deposterized image subject to the calculated constraints on the minimum bound and the maximum bound associated with the corresponding posterized color value.

4. The method of claim 3, wherein solving the PDE for each pixel in the deposterized image subject to the calculated constraints involves iteratively:
applying a kernel to each pixel in the deposterized image to generate a new pixel value; and
clipping the new pixel value, if necessary, to fall within the range defined by the calculated constraints.

5. The method of claim 3, wherein the PDE is a biharmonic PDE, wherein a solution to the biharmonic PDE is continuous, and no lines of discontinuity in the solution's derivative, while at the same time minimizing curvature.

6. The method of claim 3, wherein the PDE is a Laplace equation, wherein a solution to the Laplace equation is continuous and has no lines of discontinuity in the solution's derivative.

7. The method of claim 1, wherein generating the deposterized image involves applying the deposterization operations separately to each color channel in the posterized image.

8. The method of claim 1, wherein the posterized image is generated through either:
a simple posterization process which generates posterized color values which are evenly spaced across the set of possible color values for the deposterized image; or
a complex posterization process which generates posterized color values which are not evenly spaced across the set of possible color values for the deposterized image.

9. A computer-readable storage device storing instructions that when executed by a computer cause the computer to perform a method for deposterizing a posterized image, the method comprising:
receiving the posterized image, wherein pixels in the posterized image have color values that belong to a set of posterized color values, which is a subset of a set of possible color values for the deposterized image; and
generating a deposterized image from the posterized image, wherein color values in the deposterized image can be selected from the entire set of possible color values to reduce artifacts caused jumps in color values that arise from posterization;
wherein while generating the deposterized image, color values for pixels in the deposterized image are selected so that the deposterized image can be reposterized to restore the posterized image.

10. The computer-readable storage device of claim 9, wherein while generating the deposterized image, color values in the deposterized image are selected so that the resulting deposterized image can be reposterized by rounding each color value in the deposterized image to a nearest posterized color value.

11. The computer-readable storage device of claim 10, wherein generating the deposterized image involves:
generating a histogram for color values in the posterized image, wherein the histogram has peaks at color values which belong to the set of posterized color values;
calculating constraints for each posterized color value in the form of a minimum bound and a maximum bound, wherein the minimum bound and the maximum bound for a given posterized color value are selected so that any corresponding deposterized color value between the minimum bound and the maximum bound will be rounded to the given posterized color value during the reposterization process; and
calculating color values for pixels in the deposterized image by solving a partial differential equation (PDE) for each pixel in the deposterized image subject to the calculated constraints on the minimum bound and the maximum bound associated with the corresponding posterized color value.

12. The computer-readable storage device of claim 11, wherein solving the PDE for each pixel in the deposterized image subject to the calculated constraints involves iteratively:
- applying a kernel to each pixel in the deposterized image to generate a new pixel value; and
- clipping the new pixel value, if necessary, to fall within the range defined by the calculated constraints.

13. The computer-readable storage device of claim 11, wherein the PDE is a biharmonic PDE, wherein a solution to the biharmonic PDE is continuous, and has no lines of discontinuity in the solution's derivative, while at the same time minimizing curvature.

14. The computer-readable storage device of claim 11, wherein the PDE is a Laplace equation, wherein a solution to the Laplace equation is continuous and has no lines of discontinuity in the solution's derivative.

15. The computer-readable storage device of claim 9, wherein generating the deposterized image involves applying the deposterization operations separately to each color channel in the posterized image.

16. The computer-readable storage device of claim 9, wherein the posterized image is generated through either:
- a simple posterization process which generates posterized color values which are evenly spaced across the set of possible color values for the deposterized image; or
- a complex posterization process which generates posterized color values which are not evenly spaced across the set of possible color values for the deposterized image.

17. An apparatus that deposterizes a posterized image, comprising:
- a receiving mechanism configured to receive the posterized image, wherein pixels in the posterized image have color values that belong to a set of posterized color values, which is a subset of a set of possible color values for the deposterized image; and
- a deposterization mechanism configured to generate a deposterized image from the posterized image, wherein color values in the deposterized image can be selected from the entire set of possible color values to reduce artifacts caused jumps in color values that arise from posterization;

wherein while generating the deposterized image, the deposterization mechanism selects color values for pixels in the deposterized image so that the deposterized image can be reposterized to restore the posterized image.

18. The apparatus of claim 17, wherein while generating the deposterized image, the deposterization mechanism selects color values in the deposterized image so that the resulting deposterized image can be reposterized by rounding each color value in the deposterized image to a nearest posterized color value.

19. The apparatus of claim 18, wherein while generating the deposterized image, the deposterization mechanism is configured to:
- generate a histogram for color values in the posterized image, wherein the histogram has peaks at color values which belong to the set of posterized color values;
- calculate constraints for each posterized color value in the form of a minimum bound and a maximum bound, wherein the minimum bound and the maximum bound for a given posterized color value are selected so that any corresponding deposterized color value between the minimum bound and the maximum bound will be rounded to the given posterized color value during the reposterization process; and to
- calculate color values for pixels in the deposterized image by solving a partial differential equation (PDE) for each pixel in the deposterized image subject to the calculated constraints on the minimum bound and the maximum bound associated with the corresponding posterized color value.

20. A method for deposterizing a posterized image, comprising:
- receiving the posterized image, wherein pixels in the posterized image have color values that belong to a set of posterized color values, which is a subset of a set of possible color values for the deposterized image; and
- generating a deposterized image from the posterized image, wherein color values in the deposterized image can be selected from the entire set of possible color values;

wherein while generating the deposterized image, color values for pixels in the deposterized image are selected so that the deposterized image can be reposterized to restore the posterized image.

* * * * *